(12) United States Patent
Wang et al.

(10) Patent No.: US 12,296,544 B2
(45) Date of Patent: May 13, 2025

(54) DURABLE WATER AND OIL REPELLENT POLYMERIC DEVICES

(71) Applicant: The University of Hong Kong, Hong Kong (CN)

(72) Inventors: Liqiu Wang, Hong Kong (CN); Wei Li, Hong Kong (CN); Jiaqian Li, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 181 days.

(21) Appl. No.: 18/156,548

(22) Filed: Jan. 19, 2023

(65) Prior Publication Data

US 2023/0226777 A1 Jul. 20, 2023

Related U.S. Application Data

(60) Provisional application No. 63/266,934, filed on Jan. 19, 2022.

(51) Int. Cl.
| | |
|---|---|
| *B29C 69/02* | (2006.01) |
| *B33Y 80/00* | (2015.01) |
| *C08L 83/04* | (2006.01) |
| B29K 83/00 | (2006.01) |
| B29L 31/00 | (2006.01) |
| B33Y 10/00 | (2015.01) |

(52) U.S. Cl.
CPC ............ *B29C 69/02* (2013.01); *B33Y 80/00* (2014.12); *C08L 83/04* (2013.01); *B29K 2083/00* (2013.01); *B29L 2031/772* (2013.01); *B33Y 10/00* (2014.12)

(58) Field of Classification Search
CPC .......... F01P 2003/021; F01P 2003/024; F01P 2003/027; F01P 2003/028; F01P 2007/146; F01P 2060/08; F01P 2060/16; F01P 3/02; F01P 3/18; F01P 5/10; F01P 7/16; F01P 7/165; B29K 2083/00; B33Y 10/00; B33Y 80/00; C08L 83/04; B29L 2031/772; B29C 69/00; B29C 69/02
See application file for complete search history.

(56) References Cited

PUBLICATIONS

Jin (WO 2012088209) (Year: 2012).*
Atthi et al. (WO 2020060497) (Year: 2020).*
Huovinen, E., et al., "Mechanically Robust Superhydrophobic Polymer Surfaces Based on Protective Micropillars," Langmuir, Jan. 20, 2014, 30:1435-1443.

(Continued)

*Primary Examiner* — Lawrence D Ferguson
(74) *Attorney, Agent, or Firm* — SALIWANCHIK, LLOYD & EISENSCHENK

(57) ABSTRACT

A durable superomniphobic device is presented where the polymeric device has a surface that includes doubly re-entrant micropillars residing within pockets that are partitioned within a matrix of interconnected doubly re-entrant walls. The doubly re-entrant matrix can be in a pattern where walls that are equal to or greater in height to the micropillars intersect or otherwise contact to provide protection to the more fragile micropillars. These durable superomniphobic devices can be formed by injection molding and can repel liquids having a surface tension of about 18 to about 98 mN m$^{-1}$ and display liquid contact angle of greater than or equal to 150°.

19 Claims, 12 Drawing Sheets

(56) References Cited

PUBLICATIONS

Liu, T.L., et al. "Turning a surface superrepellent even to completely wetting liquids," Science, Nov. 28, 2014, 346(6213):1096-1100.
Li, W., et al., "Crack engineering for the construction of arbitrary hierarchical architectures," PNAS, Nov. 26, 2019, 116(48):23909-23914.
Wang, D., et al., "Design of robust superhydrophobic surfaces," Nature, Jun. 3, 2020, 582:55-59.

* cited by examiner

DURABLE WATER AND OIL REPELLENT POLYMERIC DEVICES

CROSS-REFERENCE TO RELATED APPLICATION

This application claims the benefit of U.S. Ser. No. 63/266,934, filed Jan. 19, 2022, which is hereby incorporated by reference in its entirety including any tables, figures, or drawings.

BACKGROUND OF THE INVENTION

Disposable plastics, valued at about twenty billion US dollars, are consumed annually just for biomedical and/or chemical testing, where these plastics are surface contaminated with potentially infectious pathogen residues and hazardous wastes that cost an additional twenty billion US dollars to treat for disposal. Additionally, disposable dishware valued at twenty billion US dollars are consumed annually and disposed of as plastic waste, exacerbating global plastic pollution. Cooking utensils are readily contaminated with food oils that require a large amount of water to wash them. If these devices can be replaced with reusable plastics devices that are non-sticky to liquids, significant monetary saving would ensue. Hence, durable water and oil repellent plastic devices to replace disposable plastic devices would reduce waste, save water, cleaning effort, and water.

The minimization of liquid-solid contact area is the common mode that results in super liquid-repellency. Super repellency is that where the liquid has an apparent contact angle that is greater than 150° with the surface where the nearly spherical bead rolls-off at an angle less than 5°. For example, micropillars are widely used to render a surface superhydrophobic, wherein the liquid is supported by the micropillars and only contacts the top surface of the micropillar, thus greatly reducing the liquid-solid contact area, as shown in FIG. 1A. However, such micropillars cannot suspend the low surface-tension oils, failing for oil repellency. To obtain water and oil repellency simultaneously, an omni repellency, doubly re-entrant structures are required as they can provide additional supports to suspend low-surface-tension oils in Cassie states, as shown in FIG. 1B. Unfortunately, these micropillars are fragile, as shown in FIG. 1C, and easily damaged by mechanical abrasions, therefore lacking robustness. Mechanical robustness of the surface has been addressed by augmenting the structure to include protective elements, such as larger micropillars or forming interconnected microstructures as a sacrificial layer for protection of fine-scale pillars against wear. Unfortunately, these surfaces are easily contaminated by low-surface-tension oils as they lack re-entrant structures. Recently, A more robust construction for superhydrophobic surface has been produced where a "protective armour" microstructure has been constructed where the armor matrix is filled with superhydrophobic nanoparticles, as shown in FIG. 1D, where the microstructure is formed in a strong ridged material having pockets, such as inverse pyramids, that are filled with hydrophobic nanoparticles. This device being a composite requires a fabrication of a silicon, metal, ceramic, or glass matrix that must be filled with the superhydrophobic imposing nanoparticles. These structures lack features that can render the surface resistant to oils and other fluids in addition to water based fluids. Hence, there remains a need for having a device with a surface that is both superhydrophobic and superoleophobic (superomniphobic) that is robust. Furthermore, a method of readily preparing a device with such a surface must be identified.

BRIEF SUMMARY OF THE INVENTION

An embodiment is directed to a durable superomniphobic device that is a polymer having a surface that includes doubly re-entrant micropillars residing within pockets that are partitioned within a matrix of interconnected doubly re-entrant walls, an armor. The polymer can be a thermoplastic or a thermosetting resin. The polymer can include additives such as catalysts, particulate fillers, or stabilizers. The doubly re-entrant matrix can be in a pattern that is periodic, quasiperiodic, random, or any combination thereof. The pattern can include multiple squares, rectangles, triangles, hexagons, intersecting circles, intersecting ovals, or any irregular shapes as long as walls interconnect and/or intersect to provide mutual support that provides resistance to deformation of the matrix and protects micropillars under normal impact or abrasion when the device is used. These durable superomniphobic polymeric devices can repel liquids with a liquid contact angle of greater or equal to 150° for fluids having a surface tension of about 18 to about 98 mN m$^{-1}$.

Another embodiment is directed to a method of producing the superomniphobic polymeric device described above, where a mold, having the negative features of the superomniphobic polymeric device, is injected with a fluid polymer. After solidifying the fluid polymer, the superomniphobic polymeric device that is wetted to the mold can be released to yield the durable superomniphobic polymeric device. The mold can be formed around a master device having a shape effectively identical to the superomniphobic polymeric device and removing the master device from the mold. The master device can be formed by a 3D printing process where a photosensitive resin or a plurality of metal particles are staged in the printer and the continuous solid device is formed where the laser beam used by the printer has initiated cure of the resin or fusion of the particles in irradiated volumes of the material on the stage, which is the master device after removal of uncured resin or unfused particles. A polydimethylsiloxane (PDMS) resin, or any other material that can generate an elastomeric material, can be used to form a mold about the master device. The mold is intended to be used multiple times before any need for a replacement mold. A previously manufactured durable superomniphobic polymeric device can be employed as a master device for a replacement or additional mold as needed absent or in addition to an original master.

The durable superomniphobic polymeric device can be adhered, cohered, or otherwise fixed to the substrate device, which can be a metal, polymer, ceramic, wood, paper, fabric, or glass.

DETAILED DISCLOSURE OF THE INVENTION

Embodiments are directed to devices with at least one component that provides doubly re-entrant micropillars and at least one second component that provides an interconnected double re-entrant matrix projected from a base surface, an armor, to form a partitioned elevated surface that imparts a resistance to normal impact or abrasion during use of the device so as to maintain the device's superpomniphobic. The re-entrant micropillars reside in pockets defined by the intersection or otherwise connection and mutual reinforcement of walls that form the re-entrant matrix. The re-entrant structure at the top of the walls retain the superpomniphobic nature of the surface, unlike equivalent walls absent the re-entrant structure.

Figure 1A:
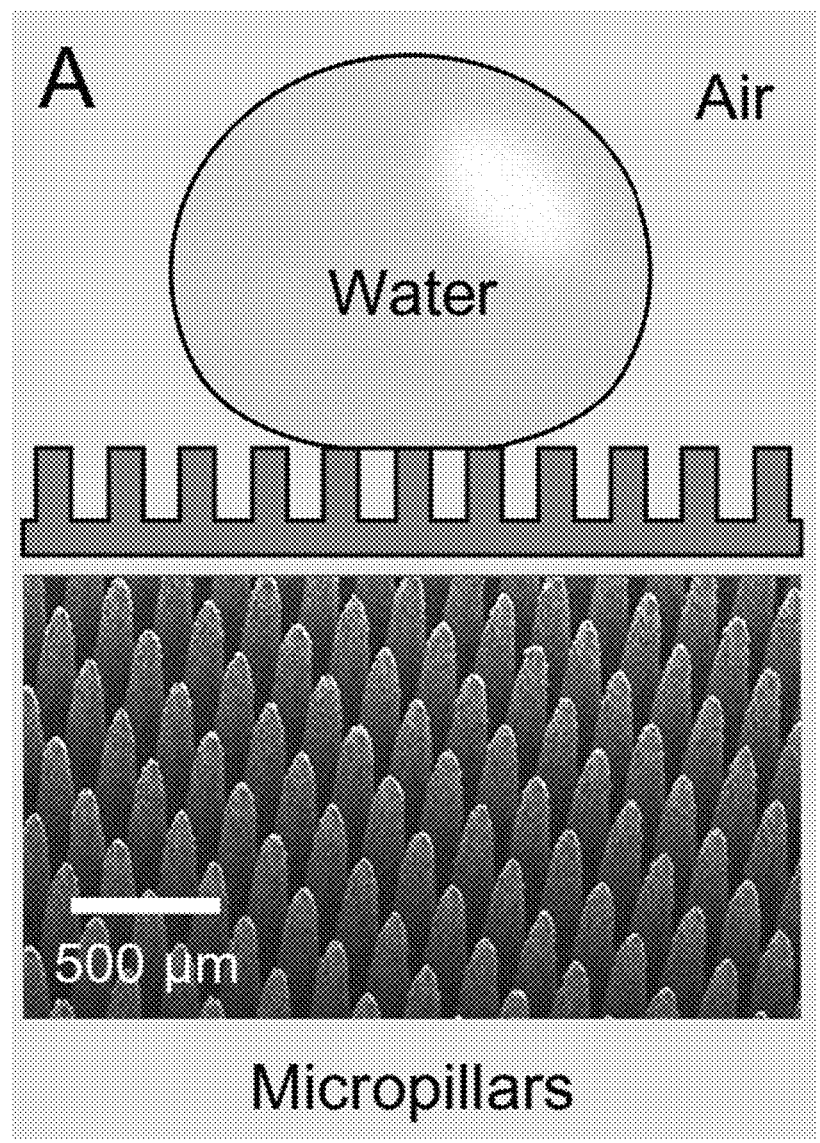
FIG. 1A shows a schematic of a prior art device with a superhydrophobic surface in contact with water and a scanning electron microscopy (SEM) image of micropillars that promote the formation of nearly spherical liquid beads of water or other high surface tension liquids.
Figure 1B:
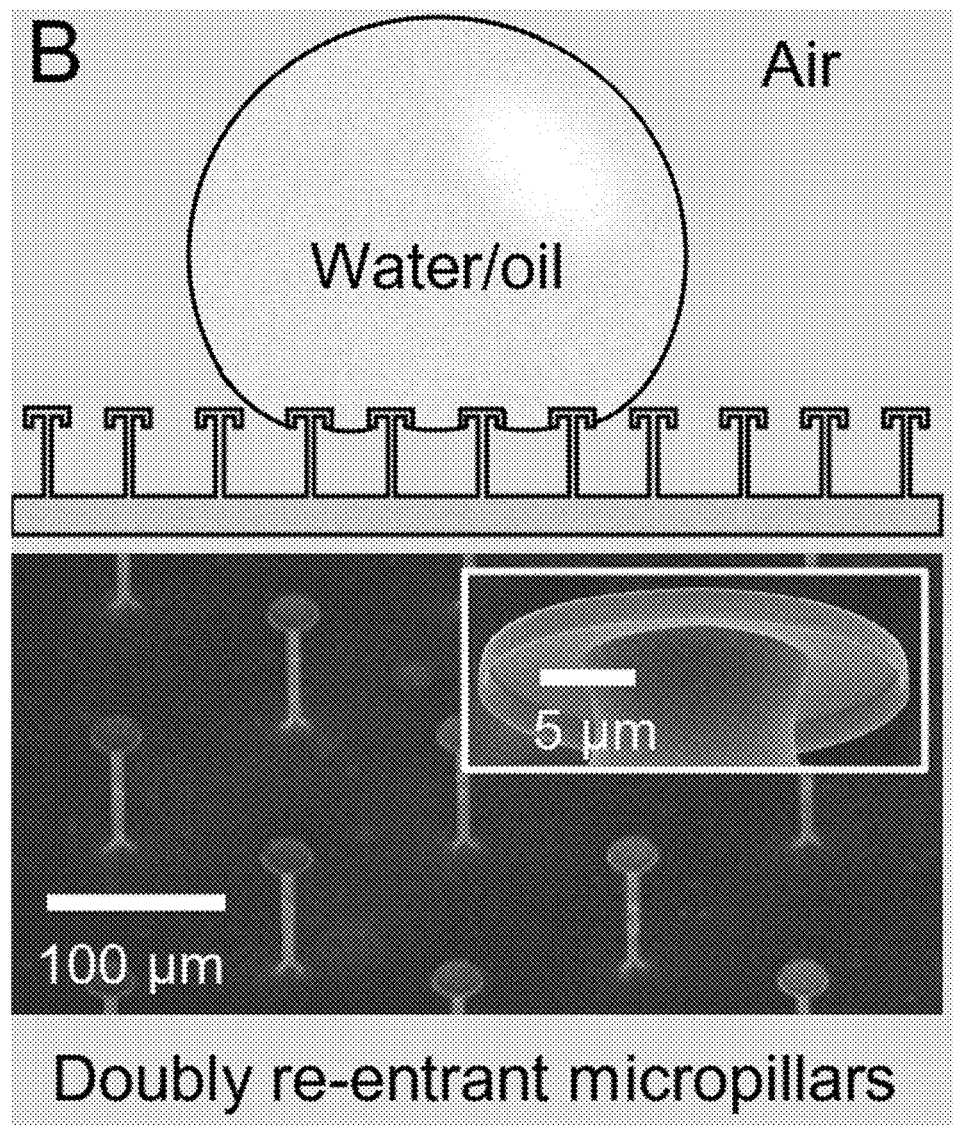
FIG. 1B shows a schematic of a prior art superhydrophobic and superoleophobic (superpomniphobic) device in contact with water or oil and a SEM image of double re-entrant micropillars that promote the formation of nearly spherical liquid beads of water, other high surface tension liquids, hydrocarbon liquids, silicone liquids, or other low surface tension liquids to form the nearly spherical liquid beads on the surface.
Figure 1C:
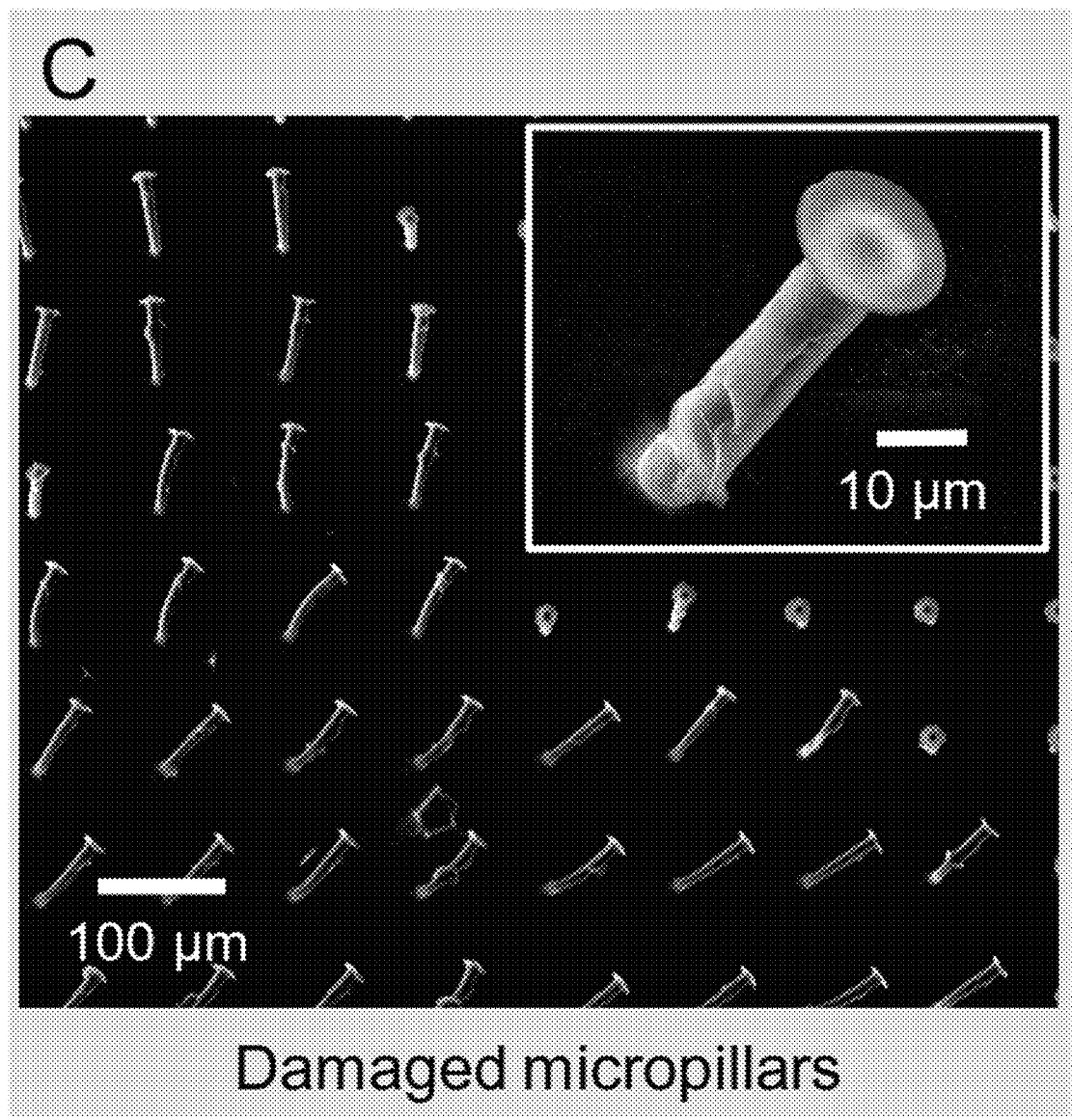
FIG. 1C shows a SEM image of a prior art double re-entrant micropillars damaged by to mechanical abrasion.
Figure 1D:
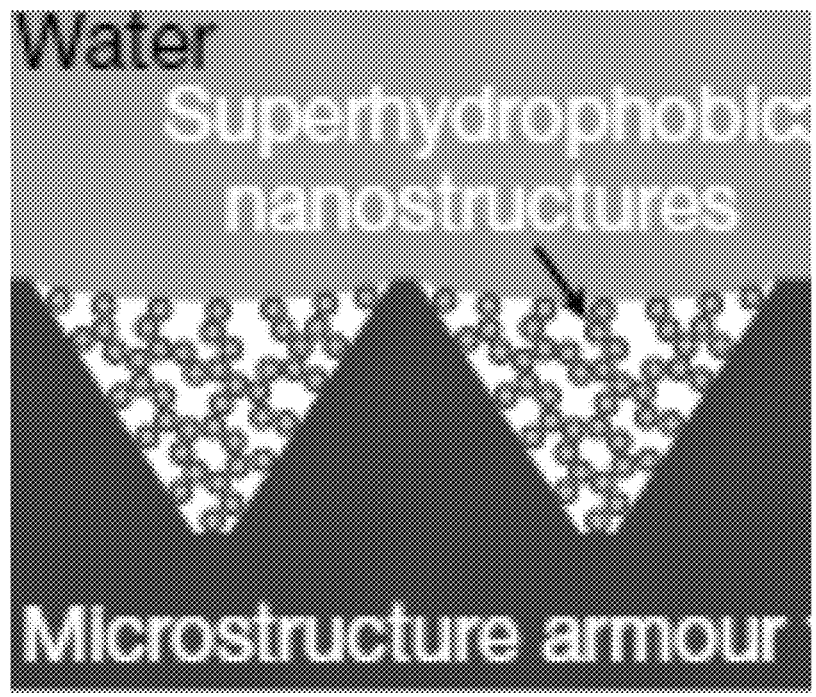
FIG. 1D shows a schematic of a prior art superhydrophobic in contact with water where the water is suspended by superhydrophobic nanostructures in inverse pyramidal pockets of a patterned robust substrate as a "protective armour".

The structure of individual re-entrant micropillars are equivalent in function to that illustrated in FIG. 1B in a side view of a prior art device. The re-entrant micropillars can be, but are not necessarily, circular in cross-section, having a liquid contacting diameter that is about 1.5 to about 3 times the diameter of the supporting pillar. The liquid contacting surface area of the re-entrant micropillars can occupy about three to about fifty percent of the surface. The height of the re-entrant micropillars can extend about 10 to about 70 μm from the base of the pockets of the re-entrant matrix in which they reside.

The height of the armor walls of the re-entrant matrix are equal to or greater than the height of the micropillars, for example, but not necessarily, 1.01 to about 2 times the height of the micropillars. The re-entrant matrix resists deformation upon impact and abrasion, such that the re-entrant micropillars within the pockets are protected within the volume defined by the walls of the matrix. The matrix can have any pattern, for example a square, rectangular, triangular, hexagonal, intersecting circles, intersecting ovals, or any periodic, quasiperiodic, or random pattern of one or more shapes such that a double re-entrant armor matrix can protect the re-entrant micropillars within the pockets from damage by normal abrasion or impact experienced when using the superpomniphobic device. The material of construction is a polymeric material resulting in a device that is super-repellent to all liquids with surface tension of about 18 to about 98 mN m$^{-1}$. The protective double re-entrant matrix, according to embodiments, provides the polymeric device with a surface that is robust and durable. The durable superpomniphobic device can be a sheet or have any geometry for a structure that benefits from its superpomniphobicity, where the durable superpomniphobic surface can be on an exterior face, such as, but not limited to a building, furniture, tools, or utensils, or an interior face, such as, but not limited to, the interior of a tube or pipe.

Figure 2A:
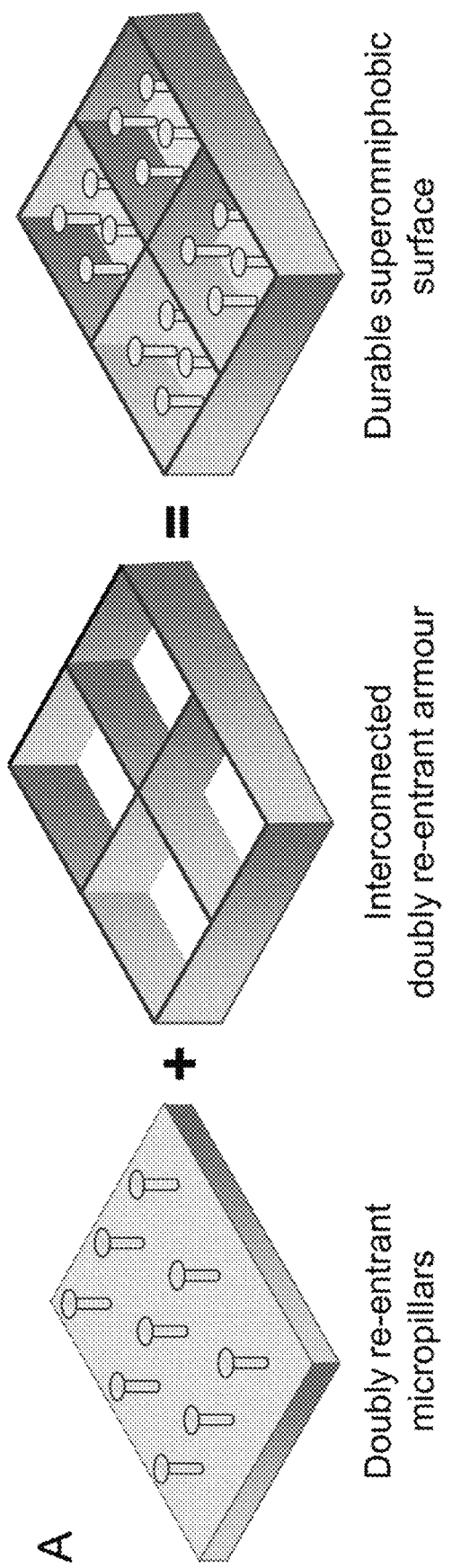
FIG. 2A shows the combined elements of a durable superpomniphobic surface where doubly re-entrant micropillars provides liquid repellency and interconnected armor matrix provides durability, according to an embodiment.
Figure 2B:
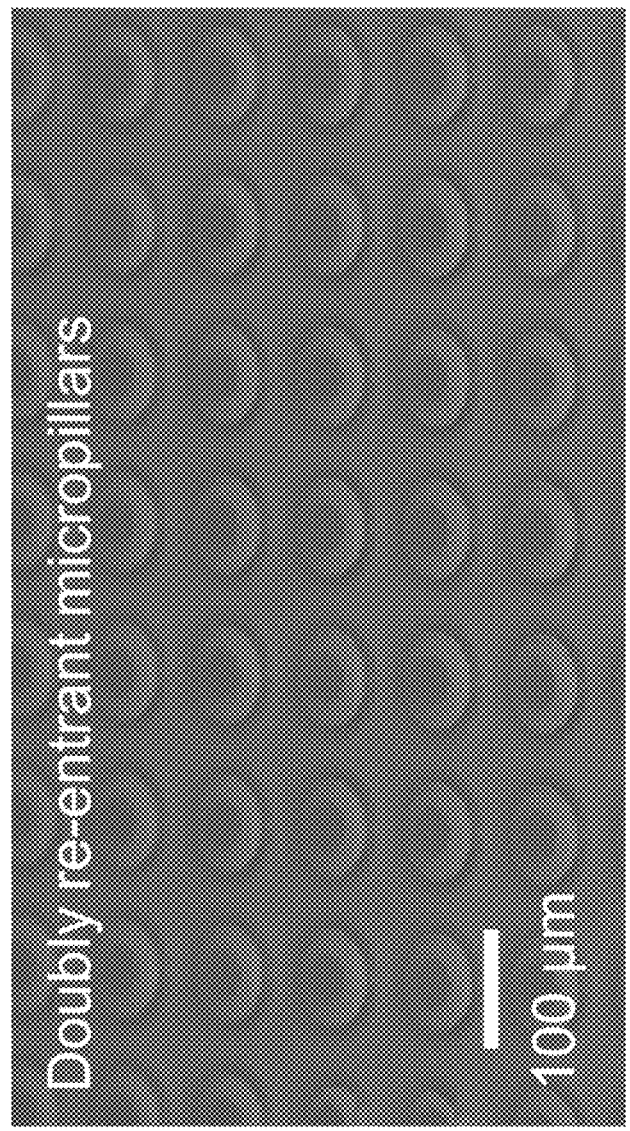
FIG. 2B shows a SEM image top view of a periodic arrangement of a fabricated doubly re-entrant micropillars.
Figure 2C:
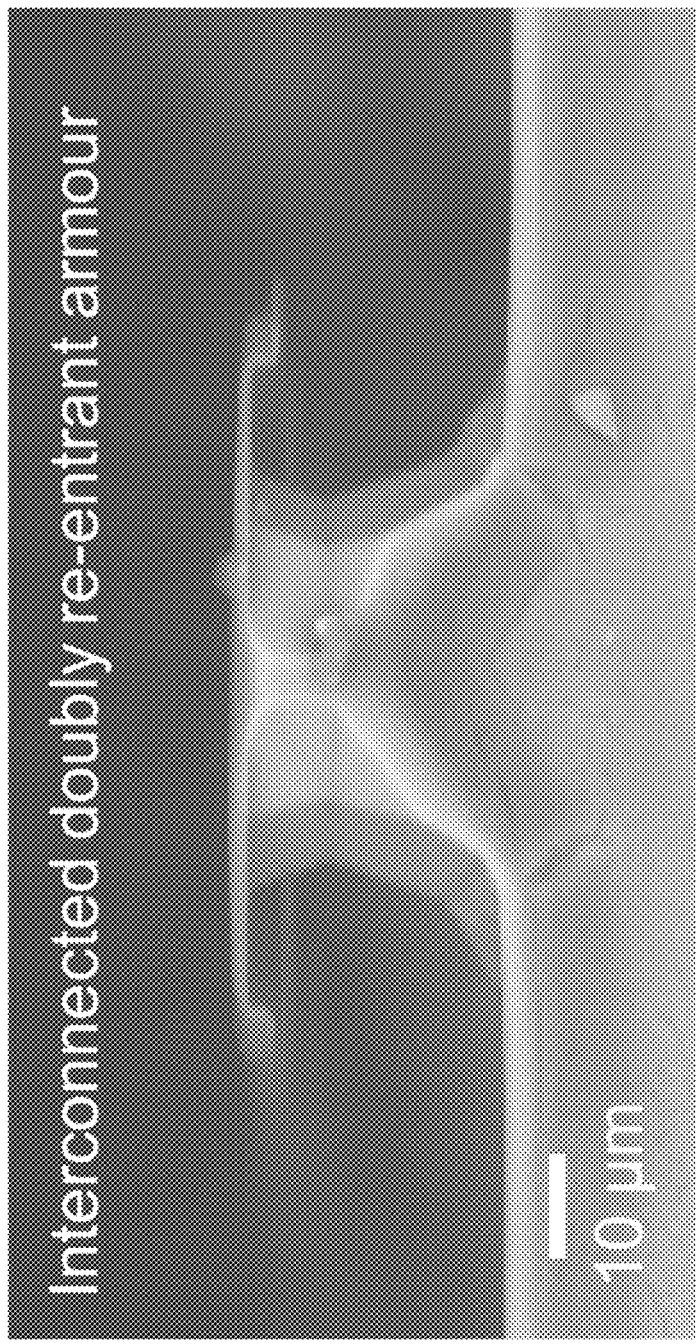
FIG. 2C shows a SEM image of a cross-section of a wall of the interconnected armor matrix with its doubly re-entrant structures.

As shown in FIG. 2A, polymeric devices with durable superomniphobic surfaces include doubly re-entrant micropillars withing pockets defined, as illustrated, as a square matrix by intersecting interconnected doubly re-entrant armor walls. As shown in FIG. 2B (top view) of the surface illustrates an exemplary distribution of doubly re-entrant micropillars formed to minimize the potential liquid-solid contact area for enhanced liquid repellency within the larger scale interconnected re-entrant armor matrix that functions as protection to the re-entrant micropillars within the pockets of the matrix. A doubly re-entrant cap residing on the distal surface of the super repellant armor wall, as shown in FIG. 2C, prevents local liquid penetration along the matrix armor. This doubly re-entrant cap of the armor is an embodiment that is vital to achieve effective oil repellency for the durable superomniphobic devices.

Figure 3:
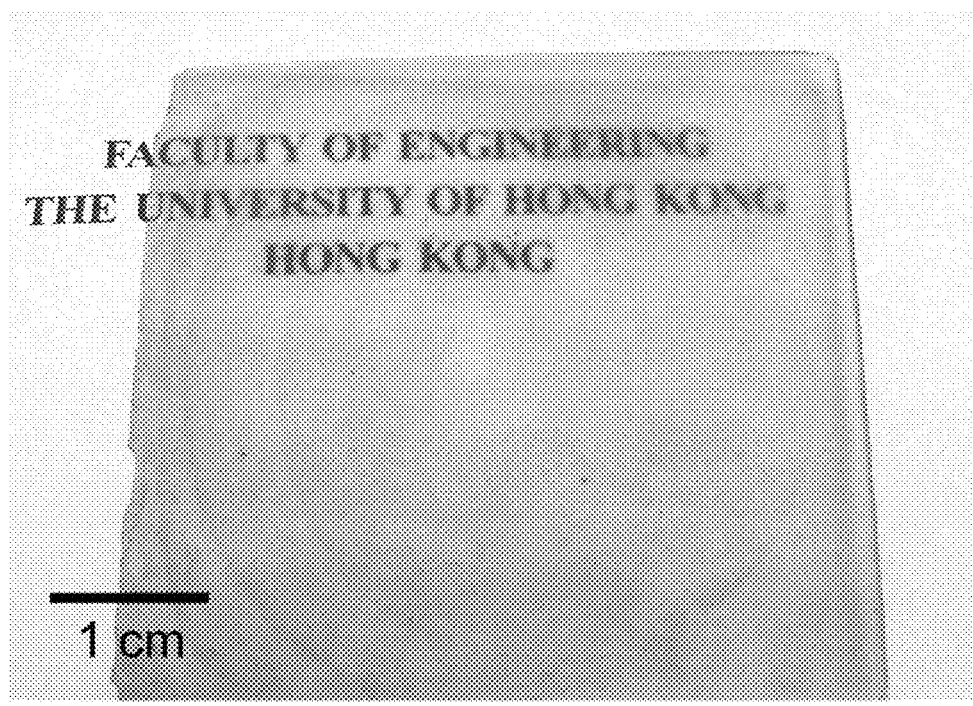
FIG. 3 shows an image of a superpomniphobic surface device of a PDMS rubber with high transparency, according to an embodiment.

In embodiments, the polymer can be a thermoplastic, such as, but not limited to, polypropylene (PP), polystyrene (PS), polyethylene terephthalate (PET), terephthalate copolymer polyester (Tritan), styrene acrylonitrile (SAN), polyacrylic acids (PAA), acrylonitrile butadiene styrene (ABS), nylon, polylactic acid (PLA), polybenzimidazole (PBI), polycarbonate (PC), polyetherimide (PEI), polyphenylene sulfide (PPS), polyvinyl chloride (PVC), polyvinylidene fluoride (PVDF), polyurethane (PU), Teflon, fluorinated poly(ethylene-co-propylene) (FEP), or any polymer that can be injection molded. Any available thermoplastics can be used for the injection-molding without the requirement of any additives, or additives can be included to modify and supplement the properties, formation, or fixing of the polymer as the superomniphobic device. The polymer can be a thermosetting resin that can be reactive injection molded, or any other molding process where a fluid polymer or prepolymer can flow into a mold and be fixed by chemical or physical associations within the polymer. The thermosetting resin can be, but is not limited to, polydimethylsiloxane (PDMS), polyester, vinylester, epoxy, phenolic, polyamide (PA), and bismaleimide (BMI). In embodiments, a transparent polymer is used, leading to a device that is transparent or nearly transparent, as shown in FIG. 3 where a polydimethylsiloxane (PDMS) is employed for an elastomeric superomniphobic device. By forming the device from any polymer that can be injection-molded, a relatively inexpensive manufacturing of multiple superomniphobic devices can be carried out.

The superomniphobic device formed in this manner can be used as molded or can be laminated to a surface of a substrate device to form a composite device where the superomniphobic device imparts the superhydrophobicity to the composite device. The substrate device can be a metal, polymer, wood, paper, fabric, ceramic, or glass device, where the durable superomniphobic device adheres, coheres, or is otherwise fixed mechanically to at least a portion of the surface of the substrate device. The nature of the adhesive, cohesive process, or fixing process can be any practiced in the art to couple two defined solid surfaces, as would be appreciated by the skilled artisan.

Figure 4A:
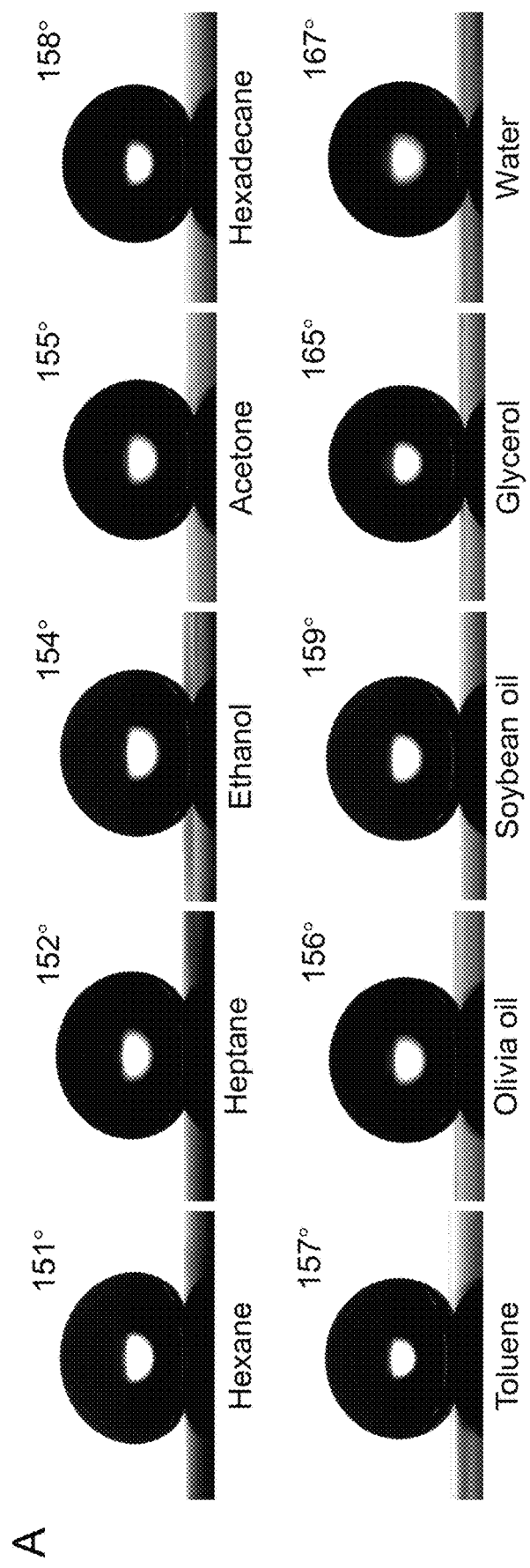
FIG. 4A shows photographs of various liquid drops with the contact angles displayed by these drops on the superpomniphobic surface of the plastic device, according to an embodiment.
Figure 4B:
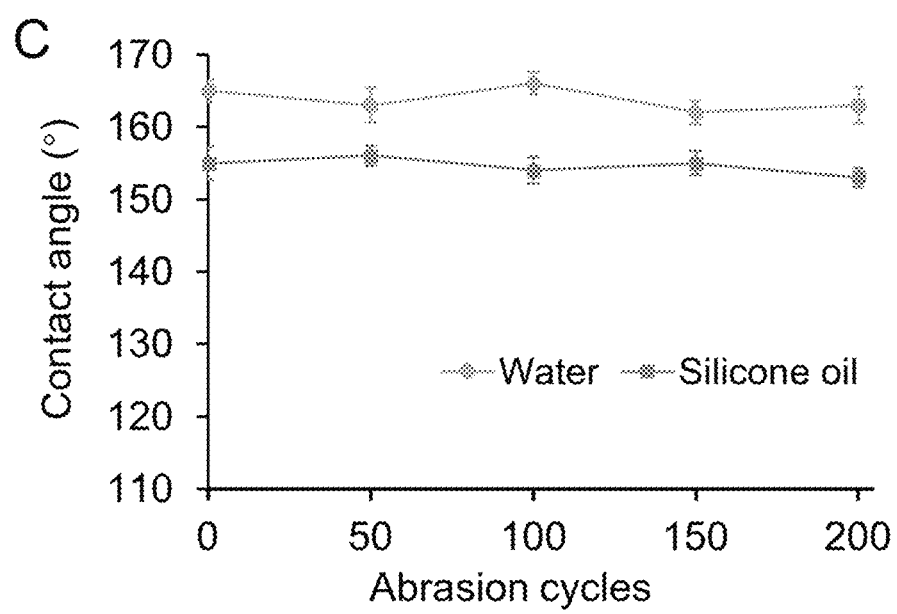
FIG. 4B is a plot of the contact angle of water and silicone oil after a series of sandpaper abrasion cycles on a polymeric superomniphobic device including a durable superomniphobic surface, according to an embodiment.

These polymeric superomniphobic devices have excellent repellency to diverse liquids, as illustrated by fluid beads on the surfaces of a device in FIG. 4A, where these liquids include, but are not limited to, hexane, heptane, ethanol, acetone, hexadecane, toluene, Olivia oil, soybean oil, glycerol, and water. All of these liquids display contact angles that are greater than 150°, indicating their super-repellency form beads of the liquids that easily roll off the superomniphobic surface without any residue when tilted to a small angle of less than 5°. Water and oil, for example, silicone oil, as shown in FIG. 4B, retain high contact angles after hundreds of abrasion cycles, showing the durability of the polymeric superomniphobic devices.

Figure 5:
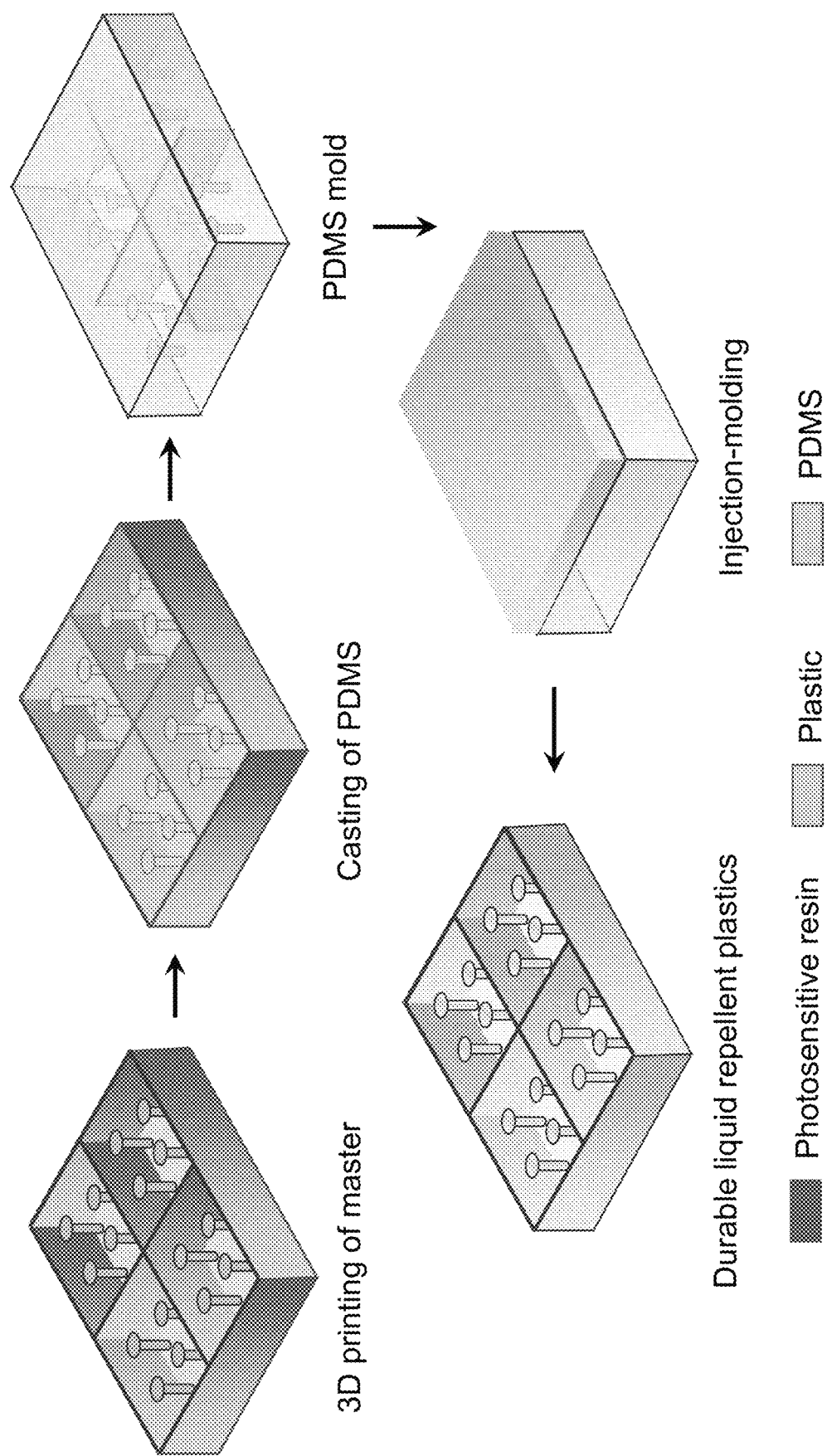
FIG. 5 is a schematic of the steps for fabricating a polymeric device including a durable superpomniphobic surface, according to an embodiment.

According to an embodiment, injection molding can be employed to produce the durable superomniphobic polymeric device. The fabrication method is outlined in FIG. 5, where: a master device having the micropillars and reentrant armor matrix is fabricated by 3D printing using a photosensitive resin or metal particles that are patterned by curing or fusion under the action of laser irradiation; a polydimethylsiloxane (PDMS) resin is casted onto the master device and cured, or gelled, to form a PDMS mold around the master, for example, but not limited to about 25° C. for about 24 hours; the PDMS mold is delaminated, peeled, from the master device; a thermoplastic melt or a fluid thermosetting resin is injected into the PDMS mold; and a polymeric superomniphobic device is released from the reusable mold.

Figure 6:
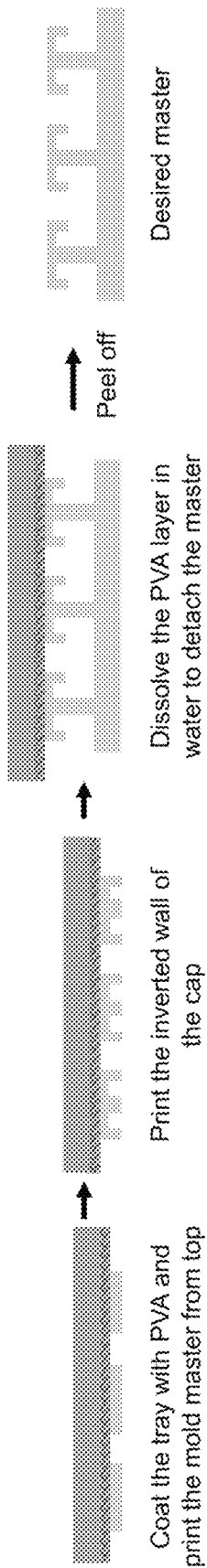
FIG. 6 shows a schematic drawing of using a PVA coated tray to print a master where the master is printed from the top and the PVA is sacrificially dissolved to release the master.

Depending upon the 3D printing system, including the supporting tray employed to support the build during printing, adhesion of the master, particularly the doubly reentrant armour, to the tray may be problematic and should be avoided or alleviated. For example, the mold master may be produced with precision using a stereolithographic (SLA) 3D printer with a precision of at least 10 µm where a sacrificial layer is deposited on the tray that can be removed with destruction of it as a layer but without imposing a load on the re-entrant structures. For example, the layer may be one that can be liquified, for example, by dissolving and draining from the superomniphobic structure formed. For example, a polyvinyl alcohol layer of about 1 to about 5 µm, may be used as the support during printing and subsequently dissolved in water, which is readily shed by the mold master, as illustrated in FIG. 6. As shown, in FIG. 6, a top to bottom or the superoleophobic layer device can be advantageous in a layer by layer production of the mold master, such that the re-entrant features are readily supported during production.

The master device can be formed of a material that is dissimilar in material to that of the mold and the master device can be a previously prepared polymeric superomniphobic device. The generally, but not necessarily, harder material master device, relative to that of the mold, permits the mold to be cleanly removed from the master device, such that the mold can be used subsequently to generate a plurality of durable superomniphobic devices. Although the exemplary mold is formed by the gelling of a PDMS resin, other rubbery materials can be used to form the mold, requiring only that the mold material does not adhere or deform during the molding process with the master device material or the polymeric material of the durable superomniphobic device. When the durable superomniphobic device is an elastomeric device, the mold may be a rigid material and the delamination of the elastomeric superomniphobic device can occur by the shape deformation of the elastomeric device during release from the rigid mold.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

Lafuma, A. & Quéré, D. Superhydrophobic states. *Nat. Mater.* 2, 457-460 (2003).

Ma, M. & Hill, R. M. Superhydrophobic surfaces. *Curr Opin. Colloid Interface Sci.* 11, 193-202 (2006).

Deng, X., Mammen, L., Butt, H.-J. & Vollmer, D. Candle soot as a template for a transparent robust superamphiphobic coating. *Science* 335, 67-70 (2012).

Liu, T. L. & Kim, C.-J. C. Turning a surface superrepellent even to completely wetting liquids. *Science* 346, 1096-1100 (2014).

Pan, S., Guo, R., Björnmalm, M., Richardson, J. J., Li, L., Peng, C., Bertleff-Zieschang, N., Xu, W., Jiang, J. & Caruso, F. Coatings super-repellent to ultralow surface tension liquids. *Nat. Mater.* 17, 1040-1047 (2018).

Liu, Y, Moevius, L., Xu, X., Qian, T., Yeomans, J. M. & Wang, Z. Pancake bouncing on superhydrophobic surfaces. *Nat. Phys.* 10, 515-519 (2014).

Cassie, A. & Baxter, S. Wettability of porous surfaces. *Trans. Faraday Soc.* 40, 546-551 (1944).

Wang, D., Sun, Q., Hokkanen, M. J., Zhang, C., Lin, F.-Y, Liu, Q., Zhu, S.-P., Zhou, T., Chang, Q. & He, B. Design of robust superhydrophobic surfaces. *Nature* 582, 55-59 (2020).

Huovinen, E., Takkunen, L., Korpela, T., Suvanto, M., Pakkanen, T. T. & Pakkanen, T. A. Mechanically robust superhydrophobic polymer surfaces based on protective micropillars. *Langmuir* 30, 1435-1443 (2014).

Li, W., Yu, M., Sun, J., Mochizuki, K., Chen, S., Zheng, H., Li, J., Yao, S., Wu, H. & Ong, B. S. Crack engineering for the construction of arbitrary hierarchical architectures. *Proc. Natl. Acad. Sci. U.S.A.* 116, 23909-23914 (2019).

Liquid-repellent plastic molded body and method for producing the same, United States Patent Application Publication No. 20210316495.

Durable superhydrophobic surfaces, U.S. Pat. No. 10,508,182.

Omniphobic porous membrane and methods for preparing the same, United States Patent Application Publcation No. 20190255564.

Huovinen E, Takkunen L, Korpela T, Suvanto M, Pakkanen T T, Pakkanen T A. Mechanically robust superhydrophobic polymer surfaces based on protective micropillars. *Langmuir* 2014, 30, 1435-43.

US Patent Applicatin Publication No. US 2021/0316495 A1, Oct. 14, 2021.

Wang, D, Sun, Q., Hokkanen, M. J., Zhang, C., Lin, F-Y., Liu, Q., Zhu, S-P., Zhou, T., Chang, Q., He, B., Zhou, Q., Chen, L., Wang, Z., Ras, R. H., Deng, X. Design of robust superhydrophobic surfaces, *Nature* 2020, 582, 55-59.

We claim:

1. A durable superomniphobic device, comprising a polymer having a surface that comprises a plurality of doubly re-entrant micropillars residing within a plurality of pockets partitioned within a matrix comprising interconnected doubly re-entrant walls, wherein a liquid contact angle of a fluid with a surface tension of about 18 to about 98 mN m$^{-1}$ is greater than or equal to 150°.

2. The durable superomniphobic polymeric device according to claim 1, wherein the polymer comprises a thermoplastic.

3. The durable superomniphobic polymeric device according to claim 2, wherein the thermoplastic is polypropylene (PP), polystyrene (PS), polyethylene terephthalate (PET), terephthalate copolymer polyester (Tritan), styrene acrylonitrile (SAN), polyacrylic acids (PAA), acrylonitrile butadiene styrene (ABS), nylon, polylactic acid (PLA), polybenzimidazole (PBI), polycarbonate (PC), polyetherimide (PEI), polyphenylene sulfide (PPS), polyvinyl chloride (PVC), polyvinylidene fluoride (PVDF), polyurethane (PU), Teflon, or fluorinated poly(ethylene-co-propylene) (FEP).

4. The durable superomniphobic polymeric device according to claim 1, wherein the polymer comprises a thermosetting resin.

5. The durable superomniphobic polymeric device according to claim 4, wherein the thermosetting resin is polydimethylsiloxane (PDMS), polyester, vinylester, epoxy, phenolic, polyamide (PA), or bismaleimide (BMI).

6. The durable superomniphobic polymeric device according to claim 1, wherein the polymer includes an additive.

7. The durable superomniphobic polymeric device according to claim 6, wherein the additive is one or more of a catalyst, particulate filler, or a stabilizer.

8. The durable superomniphobic polymeric device according to claim 1, wherein the doubly re-entrant matrix comprises a pattern that is periodic, quasiperiodic, random, or any combination thereof.

9. The durable superomniphobic polymeric device according to claim 1, wherein the doubly re-entrant matrix comprises a pattern comprising squares, rectangles, triangles, hexagons, intersecting circles, or intersecting ovals.

10. A method of producing a superomniphobic polymeric device according to claim 1, comprising:

providing a mold for a superomniphobic polymeric device, the superomniphobic polymeric device comprising a plurality of doubly re-entrant micropillars residing within a plurality of pockets partitioned within a matrix comprising interconnected doubly re-entrant walls having the micropillars and reentrant armor matrix;

injecting a fluid polymer into the mold;

solidifying the fluid polymer to yield the superomniphobic polymeric device within the mold; and releasing the superomniphobic polymeric device from the mold.

11. The method according to claim 10, wherein providing comprises:

forming the mold about a master device, wherein the mater device comprises a structure of the superomniphobic polymeric device; and removing the master device from the mold.

12. The method according to claim 11, further comprising:

staging a photosensitive resin or a plurality of metal particles within a 3D printer;

irradiating the photosensitive resin or the plurality of metal particles with at least one laser beam;

curing volumes of the photosensitive resin or fusing volumes of the plurality of metal particles irradiated by the laser beam to form the master device; and isolating the master device from the photosensitive resin or the plurality of metal particles not irradiated by the laser beam.

13. The method according to claim 11, wherein forming the mold comprises:

casting a polydimethylsiloxane (PDMS) resin about the master device;

gelling the PDMS resin to form the mold around the master device; and removing the master device from the mold.

14. The method according to claim 13, wherein removing is delaminating or peeling the mold from the master device.

15. The method according to claim 11, wherein the master device is a previously manufactured superomniphobic polymeric device.

16. The method according to claim 10, wherein the mold is reusable.

17. A composite device, comprising a durable superomniphobic polymeric device according to claim 1 laminated to a substrate device, wherein the durable superomniphobic polymeric device comprises a polymer having a surface that comprises a plurality of doubly re-entrant micropillars residing within a plurality of pockets partitioned within a matrix comprising interconnected doubly re-entrant walls.

18. The composite device according to claim 17, wherein the substrate device comprises a metal, polymer, ceramic, wood, paper, fabric, or glass.

19. The composite device according to claim 17, wherein the durable superomniphobic polymeric device comprises a thermoplastic or a thermosetting resin.

* * * * *